Sept. 25, 1923.
T. O. BROOKS ET AL
SERVICE STRUCTURE
Filed April 6, 1923
1,468,956
2 Sheets-Sheet 2
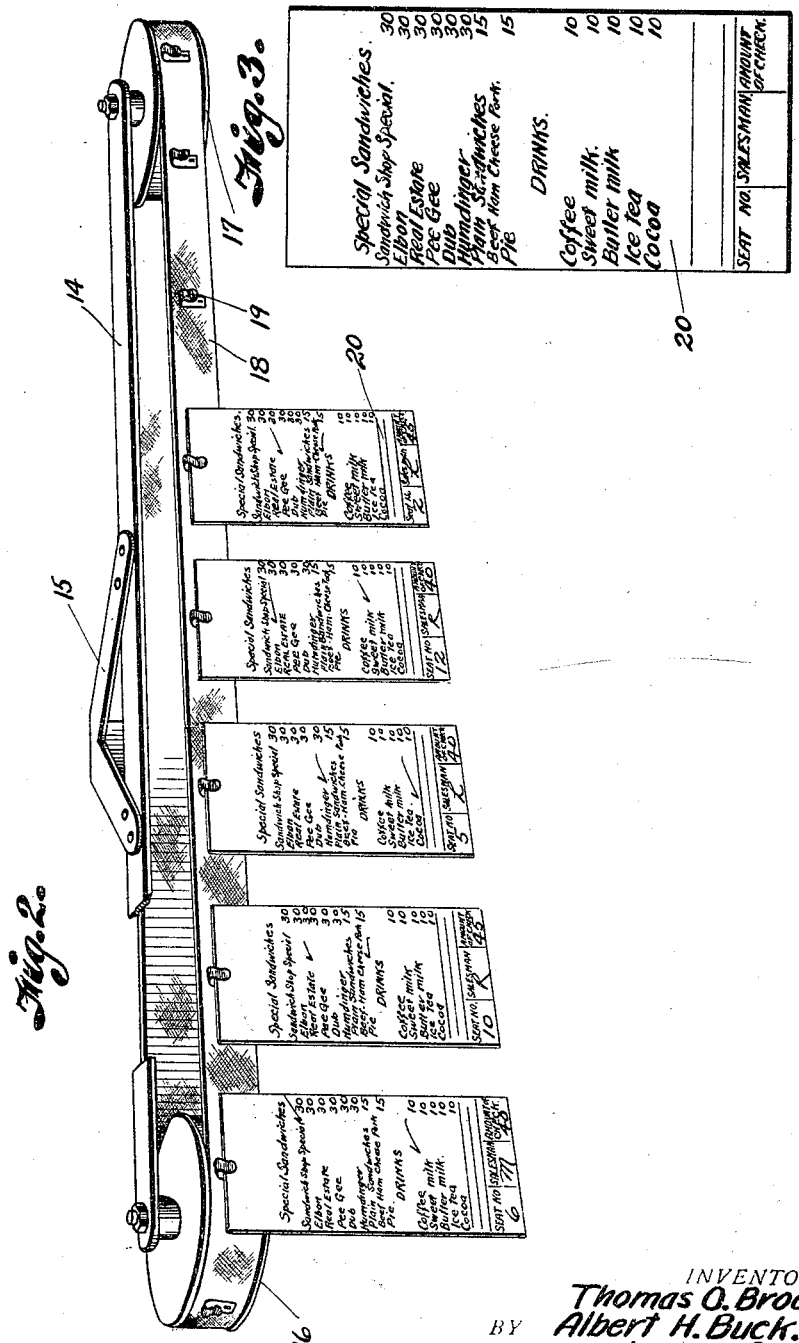
INVENTOR
Thomas O. Brooks.
Albert H. Buck.
BY Arthur C. Brown
ATTORNEY Patented Sept. 25, 1923.

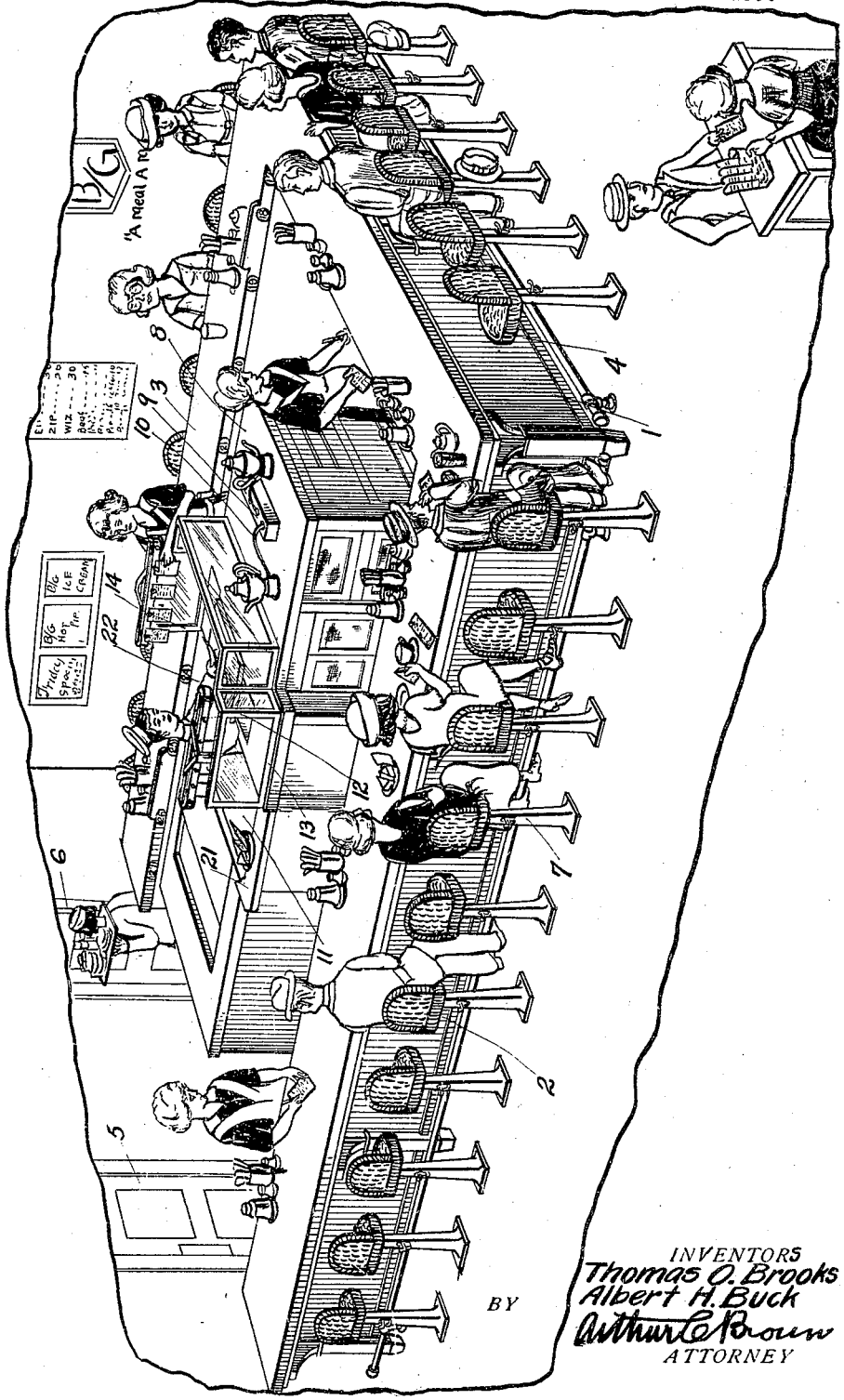

1,468,956

UNITED STATES PATENT OFFICE.

THOMAS O. BROOKS, OF DALLAS, TEXAS, AND ALBERT H. BUCK, OF KANSAS CITY, MISSOURI.

SERVICE STRUCTURE.

Application filed April 6, 1923. Serial No. 630,258.

*To all whom it may concern:*

Be it known that we, THOMAS O. BROOKS and ALBERT H. BUCK, citizens of the United States, residing at Dallas, Dallas County, Texas, and Kansas City, in the county of Jackson and State of Missouri, respectively, have invented certain new and useful Improvements in Service Structures; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a restaurant system and it is particularly designed for the efficient preparation and serving of light lunches, such as sandwiches, salads and the like.

The primary object of the invention is to provide service stations and a counter so relatively disposed that the counter stations for the patrons will be situated for the convenience of the attendants, either waitresses or waiters, as the case may be, as well as for the convenience of the chef who is to prepare the food.

The invention is particularly designed for that class of restaurants known in certain localities as "sandwich shops," where the menu is limited more or less to sandwiches, desserts, beverages and salads.

The novel construction of the invention will be clearly understood by reference to the following description in connection with the accompanying drawings, in which Fig. 1 is a perspective view of the interior of a restaurant equipped in accordance with our invention.

Fig. 2 is a perspective view of a traveling order carrier used in connection therewith, and Fig. 3 is a detail view of the order card.

The interior of the restaurant is fitted with a counter 1, preferably arranged in what is commonly termed the "horseshoe" type, that is, it has two side portions 2 and 3 and a connecting transverse portion 4. The end of the counter opposite the cross portion 4 is open so that attendants may pass through the doors 5 and 6 to enter the space within the counter and to leave it. On the outside of the counter are preferably arranged stools or chairs 7 for the convenience of the patrons.

Within the space confined within the counter is the serving station consisting of a table 8, on which is a block 9 having permanent electric contacts to be engaged by the conductors 10 for electrically heated devices, such as coffee pots, percolators, chafing dishes, toasters and the like.

At the end of the table is a stall 11 for the convenience of the chef so that the food can be prepared upon the table in rear of the vertical partition or shield 12, dividing the table into two parts, one for the chef and the other for the utensils heated through the conductors 10.

The stall is provided with appropriate bins or compartments for food, etc.

Supported on each of the side wings 13 and 14 of the vertical partition 12 is a movable order carrier. The order carrier is best shown in Fig. 2. It may comprise a bar 14 fastened to the top of the side wing of the partition by a bracket 15. The bar carries rollers or pulleys 16 and 17 at its respective ends, around which may travel an endless belt 18, carrying inverted clips 19 to receive the order cards 20. The endless belt presents two clipped faces, one toward the space between the counter and the service station and the other on the inside of the stall. Therefore, when the waiters procure the orders, they will slip them into the clips 19 from the outside of the stall and the chef will fill the orders in succession or in the order of their receipt. Therefore, as an order is filled, he moves the belt to bring a new order into view. In doing this he transfers an order card from the outside of the stall to the inside of the stall and this procedure continues as long as there are orders on the belt. This method obviates the necessity for the attendants and the chef coming into personal contact.

When the orders are placed in the clips and are filled in their order of receipt, the chef pulls the order from the clip as it is filled and places it with the dish containing the order upon one of the side wings 21 or 22, as the case may be.

It will be seen that the food can be prepared in a most sanitary manner and that a comparatively large number of persons can be served with neatness and dispatch because no unnecessary time is lost in the handling of the orders or in serving the customers.

What we claim and desire to secure by Letters-Patent is:

1. A restaurant service structure comprising a counter having parallel spaced sides and an end connecting them to provide a counter substantially "horseshoe" shape, a dispensing stand within the space between the sides and the end having a service table, a partition on the service table dividing the table into a chef stall and a delivery portion, and an endless order carrier at one side of the stall having card-receiving devices accessible from the exterior of the stall, the carrier being effective in moving the card-receiving devices progressively to the interior of the stall so that the cards can initially be placed on the carrier from the outside of the stall and be conveyed around to the chef on the inside of the stall.

2. A service structure for restaurants comprising a stall, an order carrier at one side of the stall comprising an endless belt, part of which is accessible from the exterior of the stall and the remaining part of which is accessible from the interior of the stall, and order-card-receiving clips on the belt.

In testimony whereof we affix our signatures.

THOMAS O. BROOKS.
ALBERT H. BUCK.